Patented Jan. 1, 1935

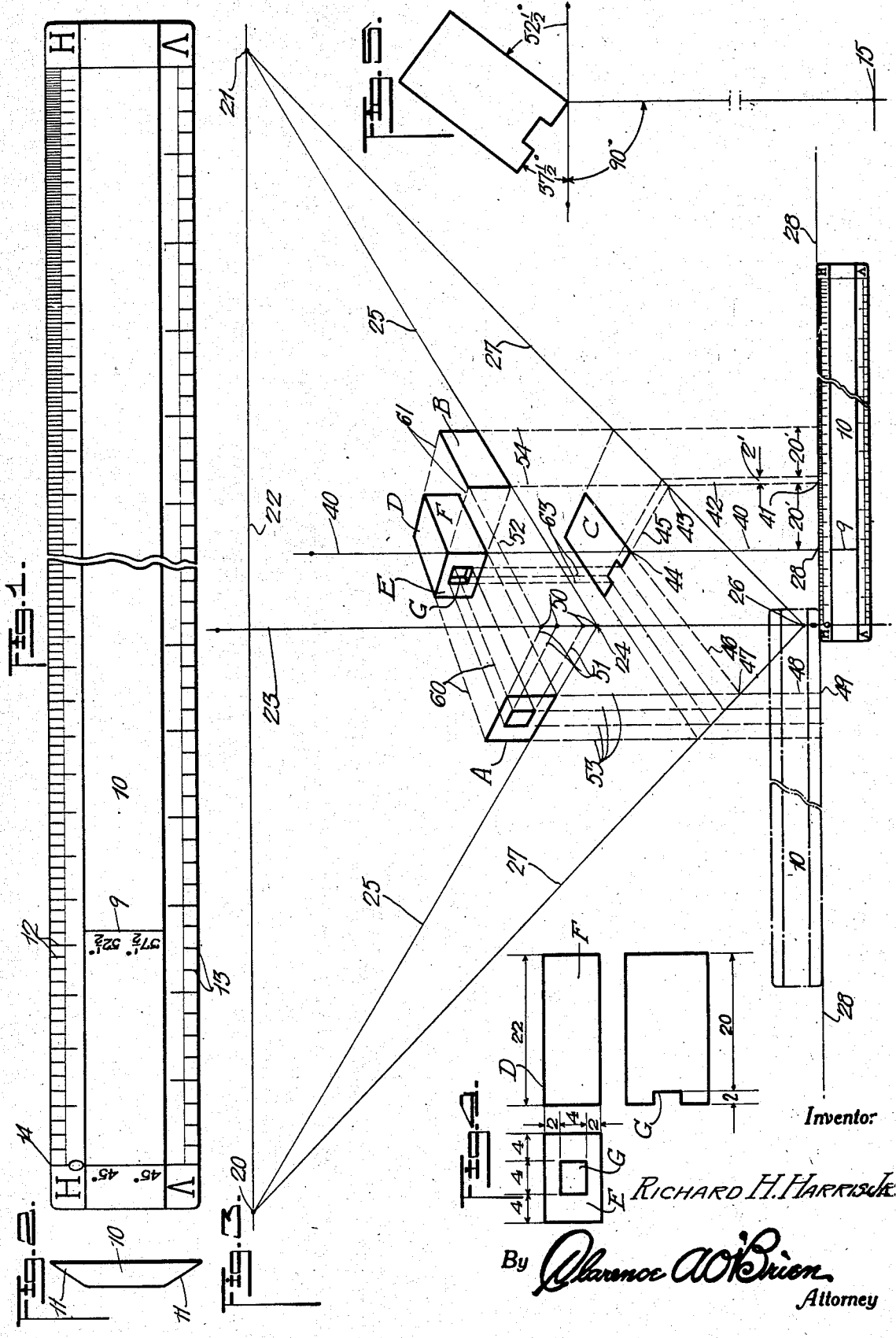

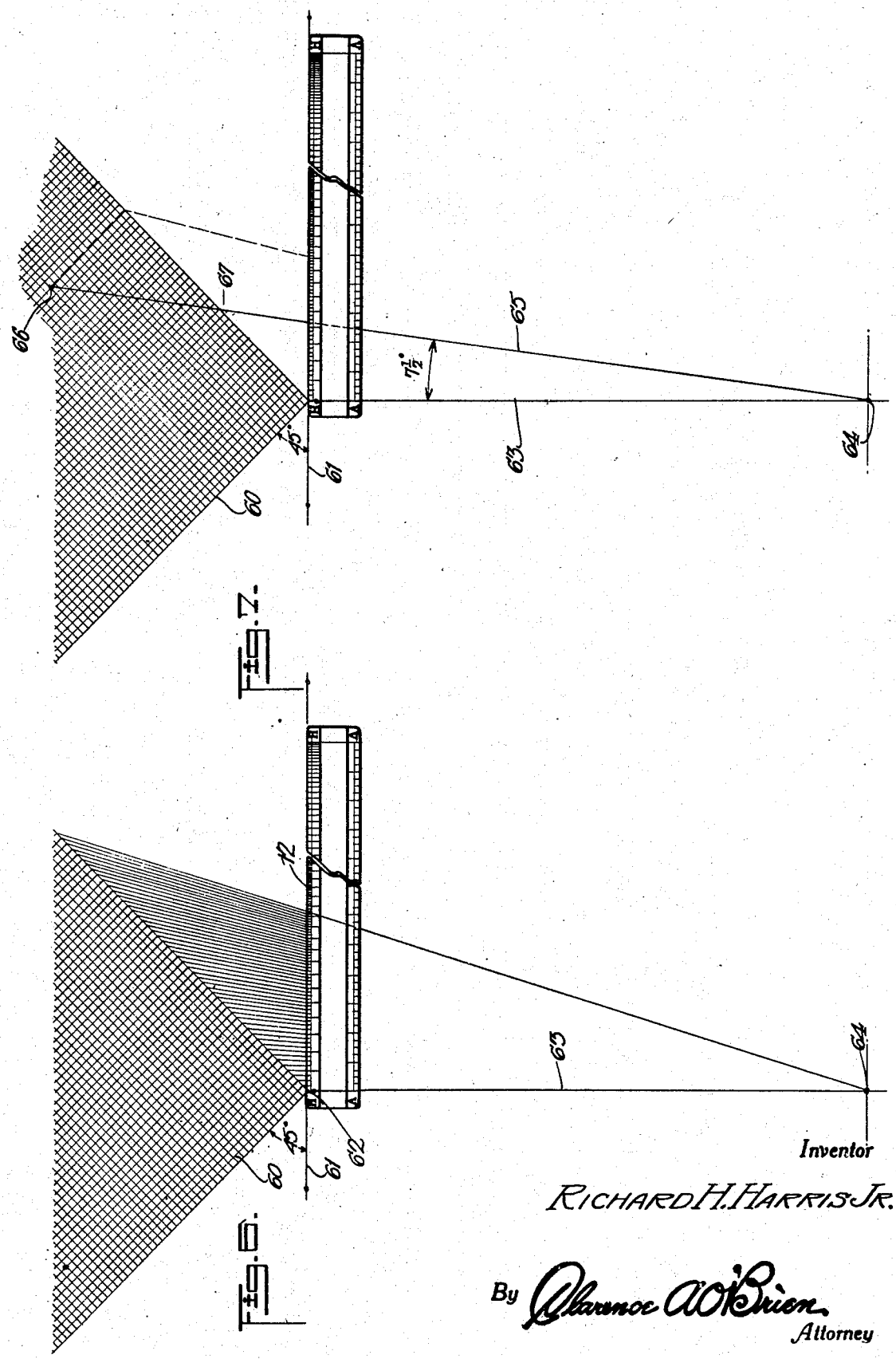

1,986,506

UNITED STATES PATENT OFFICE 1,986,506

DEVICE FOR DRAWING OBJECTS IN PERSPECTIVE

Richard H. Harris, Jr., Brooklyn, N. Y., assignor of one-fourth to Arthur J. Dunne, Bellerose, N. Y.

Application November 19, 1931, Serial No. 576,165

1 Claim. (Cl. 33—111)

The present invention relates to new and useful improvements in drafting instruments, and more particularly it pertains to a new and improved scale for drawing objects in perspective. In the drawing of objects in perspective by the generally practiced methods, a large drawing board or table is required in order to locate the various geometrical scaled plans, elevations, picture planes, viewing points, vanishing points, etc. At times, the vanishing points occur off of the surface of the drawing board and when this happens it necessitates certain changes in the preliminary geometrical work, or requires the use of a specifically constructed straight edge or other device in order to use the vanishing points located off of the board. The use of such apparatus is awkward and requires much time and space.

It is one of the objects of the present invention to provide a scale by means of which objects may be drawn in perspective on a drawing board of relatively smaller dimensions than is now required.

A further object of the invention resides in a device whereby objects of any size may be drawn in perspective from any viewing angle or distance, and at any scale without the necessity of laying out geometrically scaled plans, elevations, picture planes, viewing points, etc.

A still further object of the invention is to provide fixed vanishing points, and thereby eliminate the possibility of vanishing points occurring off of the drawing board.

A further object of the invention resides in a novel device whereby a considerable saving of time over that necessary to make perspective drawings by generally practiced methods is effected.

Other objects of the invention will appear as the nature of the invention is better understood, for which purpose reference will be had to the accompanying drawings in which like reference characters indicate corresponding parts throughout the several views.

In the accompanying drawings forming a part of this application,

Figure 1 is a plan view of a scale constructed in accordance with the present invention, Figure 2 is an end elevation thereof, Figure 3 is a schematic view showing the manner in which the scale is used and illustrating the method employed for the drawing of objects.

Figure 4 is a schematic view of an object which is to be drawn in perspective,

Figure 5 illustrates the viewing position at which the object is to be drawn in perspective, Figure 6 is a view illustrating the manner in which the scale is calibrated in order that it may function in accordance with the method described herein, and;

Figure 7 is a view similar to Figure 6, and shows the manner in which viewing angle markings are determined for the scale, and which are shown in the scale 10 of Figure 1, and marked 45°—45° and 37½°—52½°.

The scale consists of an elongated body portion 10, and its two opposite side edges may be bevelled as at 11. The bevelled side edges are provided with calibrations 12 and 13. The calibrations 12 are so arranged that the spaces between them diminish or reduce progressively as they extend from the zero point which is designated 14 in the drawings, and the rate of decrease of the spaces between the calibrations is proportionate as will be hereafter described as will also the method in which the calibrations are formed. The calibrations 13 are arranged in spaced relation in which the spacing between the calibrations does not vary as in the case with the calibrations 12. A viewing angle marking 9 is provided, and its location with respect to the calibrations 12 is determined in a manner to be hereinafter described.

In the group, Figure 4, there is shown an end elevation, side elevation and plan view of an article which is to be drawn in perspective by the use of the scale heretofore described. It will be noted that in Figure 4 there is no perspective drawing of the article but several dimensions are given, and by the use of these dimensions and their application to the scale and the method to be hereinafter described, a true perspective drawing of the object such as illustrated in Figure 4 may be produced.

In Figure 5, is illustrated the viewing position at which the object is to be drawn in perspective. In this figure, the viewing point is designated 15 and for purposes of illustration is located 118 unit dimensions of the object as shown in Figure 4, from the object. Two sides of the object are visible and one is viewed at an angle of 37½° and the other at an angle of 52½°.

In producing the perspective drawing of the object shown in Figure 4 of the drawings, and in accordance with the desired viewing position shown in Figure 5, I proceed in accordance with a method which is illustrated in Figure 3 of the drawings and will now be described.

In carrying out the method of use of the device,

I first locate two vanishing points 20 and 21. These vanishing points are located at a predetermined distance apart to fit any standard size drawing board, and it is to be understood that the distance between the vanishing points 20 and 21 will be determined by the character of the scale, and this distance will be given upon the scale or as part of instructions in its use which accompanies the same.

The vanishing points 20 and 21 are connected by a line 22 which I will hereafter term the horizon line, and midway between the vanishing points 20 and 21, and extending at right angles to the horizon line 22, I locate a line 23 which I will hereafter term the vertical measurement line. The height at which the object is to be viewed is next determined, and this dimension is measured from the horizon line downwardly upon the vertical measurement line 23, using the scale 13 for this purpose, and is in the present illustration of the invention designated 24. This point 24 is then connected by means of lines 25 with the vanishing points 20 and 21. These lines represent the ground line or level of the surface upon which the object is theoretically intended to rest.

It is to be understood that in the use of the scale 10, the calibrations 12 and 13 may be given any desired linear value but that whatever value is determined for one, will also be used in connection with the other. For example, if the object to be drawn in perspective is of a relatively small dimension, the calibrations 12 and 13 may be considered as inches or fractions thereof. If, however, the object to be drawn in perspective is of a relatively large dimension, the calibrations may be considered as feet, yards, rods, or even miles as would be the case in laying out large areas or tracts of land in perspective. Reducing the linear value of the calibrations 12 and 13, will increase the size of the finished perspective and increasing the linear value of the calibrations will decrease the size of the finished perspective.

After the several points heretofore mentioned have been located upon the surface upon which the drawing is to be made, the vanishing points 20 and 21 are connected with an arbitrary point 26 by means of lines 27 which will be hereinafter referred to as the plan lines. This arbitrary point 26 is located on the vertical measurement line 23, but sufficiently below point 24 so that plan figures when drawn in perspective will not fall into the area occupied by elevations drawn in perspective as will hereinafter be pointed out.

A horizontal measuring line designated 28 in the drawings is laid out in such a manner as to extend upon opposite sides of the vertical measurement line, while in the present illustration of the invention, this horizontal measurement line 28 is shown as extending at right angles to the vertical measurement line, this measurement line 28 need not necessarily be horizontal since such measuring line may be arcuate or disposed at an angle other than a right angle to the vertical measurement line 23, and this will depend on the shape of article upon which the calibrations of the scales are printed, or the manner in which the calibrations are laid out. The main purpose of the scale, regardless of its shape or calibrations, is to assist the method, which requires condensed dimensions in order to eliminate the scaled geometrical preliminary work required in present perspective methods, and which in turn requires a large drawing surface.

The scale with calibrations 12 is next placed along the horizontal measuring line 28 with the zero mark 14 always coinciding with the vertical measurement line 23. With the scale in this position, a line 40 is projected vertically from the viewing angle marking 9, and this line will be hereinafter referred to as the viewing angle line.

Considering the unit dimensions given in figure 4, as feet, the viewing point 15 in Figure 5 will be located one hundred eighteen feet from the object as heretofore explained. The nearest possible viewing distance at which an article can be drawn as viewed at angles of 37½°–52½° with the scale herein illustrated is ninety three units which in this case is ninety three feet. When the object is to be drawn as viewed from this nearest possible viewing point of ninety three units, the unit dimensions of the object are laid off on the horizontal measurement line 28 starting from the viewing angle marking 9. When, however, the viewing point is at any distance greater than this minimum distance of ninety three units, a starting point beyond the viewing angle marking 9 must be used and this starting point is determined in the following manner.

For every division of the calibrations 12 which is skipped on the right hand side of the viewing angle line 40, a distance of the value of one and one quarter units will be added to the viewing distance. Since then, the viewing distance in the present case is one hundred eighteen feet, and the divisions between the calibrations 12 are being considered as feet, it becomes necessary to begin the laying off of the unit dimensions at a point twenty divisions beyond the viewing angle marking 9 and designated 41 in Figure 3. The divisions between the calibrations equalling feet, and each adding to the viewing distance a value of one and one quarter feet, the twenty divisions skipped having a value of twenty feet when increased as stated by a value of 25 per cent, gives a total linear value of twenty five feet which when added to the minimum of ninety three feet, gives a viewing distance of one hundred eighteen feet, the viewing distance used in the present illustration of the invention.

The starting point 41 being laid off on the horizontal measurement line 28, is projected vertically to the plan line 27 at the right of the vertical measurement line 23 as indicated by the broken line 42, its point of intersection with the plan line being designated 43. This point 43 is then projected towards the vanishing point 20 as indicated by broken line 45 to the point 44 where it intersects the viewing angle line which point 44 locates the nearest corner of the object in its correct perspective position.

The plan line 27 at the left hand of the vertical measurement line is next connected with the point 44 by means of a broken line 46, which if extended, would meet the vanishing point 21, the point where this line meets the left hand plan line 27 being designated 47. From the point 47 a line 48 is projected vertically downward to a point 49 on the horizontal measurement line 28, which point constitutes the starting point for laying off of the unit dimensions for drawing the front of the object which is drawn in perspective elevation at the left of the vertical measurement line, the side of the object being drawn in perspective elevation on the right hand side of the vertical measurement line. Thus it will be seen that the points 41 and 49 constitute the points from which the dimensions are laid off for the side and front respectively of the object.

The object is designated D and has a front E, and a side F, and in the present illustration of the invention, the front of the object is shown as provided with a recess G. As illustrated, the object is of rectangular form, and in accordance with the selected example, is twelve feet wide, eight feet in height, and twenty two feet in length, with a recess or set back four feet square and two feet deep in its visible end.

The scale is positioned as illustrated in full lines in Figure 3 and the dimensions laid off for the side of the object upon the horizontal measurement line 28 on the right of the vertical measurement line 23, after which, the scale 10 is inverted as illustrated in dotted lines in Figure 3 and the several dimensions of the front of the object are laid off on horizontal measurement line 28 to the left of the vertical measurement line 23.

The height dimensions are next laid off on the vertical measurement line 23 in a direction extending upwardly from the point 24 thereon as illustrated by the reference character 50 it being understood that the calibrations 13 of the scale are employed for that purpose.

The next step consists in employing the laid off dimensions on the horizontal measurement line 28, and those upon the vertical measurement line 23 to draw the front and side of the object in perspective elevation upon the ground lines 25 and a plan of the object to the right of the vertical measurement line 23 and at a point below the right hand ground line 25. These perspective elevations are designated A and B respectively in the drawings and the plan is designated C, and while they are not true perspective views, they serve the means by which the true perspective view of the object is obtained.

The front and side perspective elevations and the plan are formed in the following manner. The dimension points 50 on the vertical measurement line are extended upon opposite sides of the said vertical measurement line in the direction of the vanishing points 20 and 21 as indicated by the broken lines 51 and 52 respectively. After this has been done, the several dimension points on the horizontal measurement line are projected vertically until they intersect the lines 51 and 52 and the points of intersection form the salient points of the perspective elevations. These vertically projected lines which together with the lines 51 form the perspective elevation of the front of the object are designated 53, and the vertically projected lines which together with the lines 52 form the perspective elevation of the side of the object are designated 54. It will be noted that these vertically projected lines 53 and 54 all intersect the plan lines 27 and if lines be projected from each of these points of intersection with the plan lines in the direction of that vanishing point upon the opposite side of the vertical measurement line, the area within the points where these lines intersect will constitute a plan of the object.

The perspective elevations A and B having been completed as heretofore described, on the salient points of said perspective elevations the perspective drawing is completed by projecting the salient points of the perspective elevations in the direction of the vanishing point upon the opposite side of the vertical measurement line to that upon which the perspective elevation is located. These projection lines are designated 60 and 61 in the drawings and in the present illustration of the invention, these lines intersect one another to the right of the vertical measurement line, and the area within these points of intersection will constitute the true perspective drawing of the object.

Ornamentations upon either exposed face of the object, such for example as the recess G may be formed by vertical projection lines 63 extending from the plan drawing C. It can be readily seen that the plan C is necessary when there are points or lines in one elevation, that have not corresponding points or lines in the other elevation.

While in the foregoing, I have described the invention and its manner of use for drawing in perspective an object at a given viewing distance and viewing angle, the scale may be employed to draw objects in perspective without regard for either viewing distance or viewing angle.

When objects are to be drawn in perspective at a given viewing angle but without regard to viewing distance, the viewing angle line 40 is located as heretofore described, but instead of locating the point 41 at which the measurements for the side of the object start and from which the starting point 49 for the measurements of the front of the object is located, the point 44 is arbitrarily located upon the viewing angle line 40. If now, lines are drawn from each plan line to the opposite vanishing point through the point 44, and the point where these lines intersect the plan lines projected to the horizontal measurement line, the points where they intersect the horizontal measurement line will constitute the starting points for laying off the dimensions for the front and side of the object.

In some instances, it may be desirable to draw an object in perspective without regard to either viewing angle or viewing distance and when such is the case, the user may start to lay off the measurements at any point along the measurement lines, and proceed from said point in the heretofore described manner. In this last mentioned method of procedure, no viewing angle line such as 40 is employed.

Also, it may be desirable to draw the object in perspective so that its left hand side is viewed at an angle of fifty two and one half degrees, in which case, the viewing angle line must be located to the left of the vertical measurement line which is accomplished by placing the scale in the position in which it is shown in dotted lines in Figure 3 and proceeding in the same manner as when the viewing angle line is located to the right of the vertical measurement line.

Having described the invention, I will now proceed to describe the manner in which the calibrations 12 are formed upon the scale 10 in such a manner that the spaces therebetween reduce as the calibrations proceed from the zero (0) point on the scale.

Figure 6 shows the method of determining the division markings, and it is accomplished in the following manner. A plan 60 is laid out behind a picture plane 61 at an angle of 45°, and with one corner 62 of the plan 60, touching the picture plane line as shown. A center line of sight 63 is drawn from the point 62, and upon this line the viewing point 64 is located. The plan is subdivided with small squares, and these subdivisions on one side of the plan are projected towards the viewing point 64, and form the required scale divisions at the points where they cut through the picture plane line 61.

The distance between the viewing point 64 and the plan, determines the distance between the two required vanishing points 20 and 21 shown in Figure 3. The distance between the vanishing points is always twice the distance between the viewing point and the plan. The plan can be any size and can have any size subdivisions.

It can be readily seen that the over-all length of the scale, the spacing between each division, and the distance between vanishing points, is dependent upon the size of the plan, the size of the subdivisions, and the distance of the viewing point from the plan.

Figure 7, shows the method of determining the 37½°-52½° viewing angle mark for the scale, and it is accomplished in the following manner which is similar for all other viewing angle marks that may be desired.

The same layout as Figure 6 is used, and an angle line 65 is projected into the plan 60, from the viewing point 64, and at an angle of 7½° from the center line 63. The viewing angle mark for the scale is located at the point where the angle line 65 cuts through the picture plane line 61. In this case the viewing angle mark coincides with the 17th scale division.

Now to determine how different viewing distances can be gotten when using the 37½°-52½° mark on the scale, a point 66 can be located on the angle line 65 and at any position within the plan. Projecting point 66 parallel with the left side of the plan, until it meets the right side of the plan, and then down to the scale in the direction of the viewing point 64 will show the amount of scale divisions that must be skipped in order to draw a perspective that will coincide with the viewing distance of point 66.

The distance between the viewing point 64, and the point 67 at which the angle line 65 cuts through the right side of the plan, is 93 divisions, in this case, and is the shortest possible viewing distance when using the 37½°-52½° mark on this scale. The subdivisions in the plan 60 are used as a gauge for measuring this distance. The illustration, Figure 7, also shows that point 66 is twenty five divisions further than the ninety three division point 67, which makes the viewing distance from point 66, one hundred eighteen divisions. When point 66 is carried down to the scale as shown, it coincides with the 37th scale marking, and proves that the perspective illustration Figure 3, is correct, as the dimensions were started at the 37th scale marking, to get the desired viewing distance of one hundred eighteen feet.

Figure 7 illustrates the method to be used by a scale manufacturer for determining the exact positions at which any desired viewing angle markings are to be printed on the scale.

For example, the manufacturer may want viewing angle markings every 5°, as 45°—45°, 40°-50°, 35°-55°, 30°-60°, etc. The first viewing angle marking of 45°—45° would correspond to the zero point on the scale. To find the correct location for the 40°-50° viewing angle marking, the angle line 65 would be laid off 5° from the center line 63, instead of the 7½°, as shown in Figure 7. For a 35°-55° viewing angle marking, the angle line 65 would be laid off 10° from the center line 63, and so on for each successive viewing angle marking desired.

The angle line 65 can be placed at any angle from the center line 63, and this angle determines the value of the viewing angle marking and also its location on the scale.

The angle line 65 is placed at 7½° from the center line 63 in order to locate the position on the scale for a 37½°-52½° viewing angle marking. The cross lines forming the small squares in the plan 60, are at angles of 37½°-52½° with the angle line 65.

It can be readily seen that if it is necessary to skip twenty scale divisions in order to add twenty five divisions to the viewing distance, then by skipping one scale division, there is an increase of 1¼ divisions to the viewing distance. This information, when determined by the manufacturer, can be inscribed or printed on the scale, and the manufacturer can decide how and where it should be placed. It is to be noted that each individual viewing angle marking that may be decided on for the scale, will require a different value other than one and one-quarter, and this will be worked out and geometrically determined by the manufacturer.

It is to be understood that the invention is not to be limited to those forms in which it is herein illustrated, and that it may be practiced in other forms and variations not herein described, but which fall within the scope of the appended claim.

Having thus described the invention, what is claimed as new and what it is desired to secure by Letters Patent of the United States, is:

A scale for drawing objects in perspective, comprising an elongated member having two straight edges, one of the edges being provided with calibrations with spaces therebetween that progressively decrease from one end of the scale to the other, uniformly spaced calibrations along the other edge of said member, the calibrations being respectively for scaling off horizontal and vertical dimensions of an object viewed in perspective, and viewing angle markings on said scale that determine the starting points along the first mentioned calibrations for scaling off dimensions of the object to be drawn in the desired angle of perspective.

RICHARD H. HARRIS, Jr.